United States Patent [19]

Narasaki

[11] Patent Number: 5,128,192
[45] Date of Patent: Jul. 7, 1992

[54] BRAIDED PREFORM PROCESS FOR THERMOPLASTIC HONEYCOMB CORES

[75] Inventor: John R. Narasaki, Camarillo, Calif.

[73] Assignee: Northrop Corporation, Los Angeles, Calif.

[21] Appl. No.: 474,965

[22] Filed: Feb. 2, 1990

[51] Int. Cl.$^5$ ............................................. B32B 3/12
[52] U.S. Cl. .................................. 428/118; 156/148; 156/292
[58] Field of Search ................... 428/116, 117, 118; 156/148, 197, 292

[56] References Cited

U.S. PATENT DOCUMENTS

| | | | |
|---|---|---|---|
| 3,321,355 | 5/1967 | Holland | 428/116 |
| 4,412,880 | 11/1983 | Wintermantel | 428/117 X |
| 4,615,859 | 10/1986 | Traut | 428/116 X |
| 4,615,933 | 10/1986 | Traut | 428/252 |
| 4,622,091 | 11/1986 | Letterman | 428/116 X |
| 4,966,801 | 10/1990 | Becker et al. | 428/113 |

Primary Examiner—Henry F. Epstein
Attorney, Agent, or Firm—Terry J. Anderson; Robert B. Block

[57] ABSTRACT

For producing ultra strong lightweight core material for composite structure such as aircraft wings, fairings and stabilizers, preimpregnated thermoplastic fiber yarn is processed according to this invention into blocks of ducted core material having a balanced honeycomb pattern. A tubular thermoplastic fabric sheath is braided along shaped mandrels, positioned end to end, as they pass through a braiding machine. The sheath is cut apart at the mandrel ends and the sheathed mandrels are stacked uniformly into a press, where the stack is compressed to contact all interfacial facets. Then heat is applied to fusion bond the stack together at the interfacial facets. Then after cooling to a setting temperature, the pressure is removed and the stack is removed from the press for mandrel extraction. In an embodiment utilizing metal mandrels treated with a release agent, the mandrels are extracted by pressing them out of the bonded block individually with a special long stroke pneumatic press having a long thin pin supported by fixed and floating bushings. In a preferred method, which eliminates extraction pressing, the mandrels are cast from a washable, high temperature eutectic salt so that the mandrels may be removed from the bonded stack by a hot water wash.

7 Claims, 3 Drawing Sheets

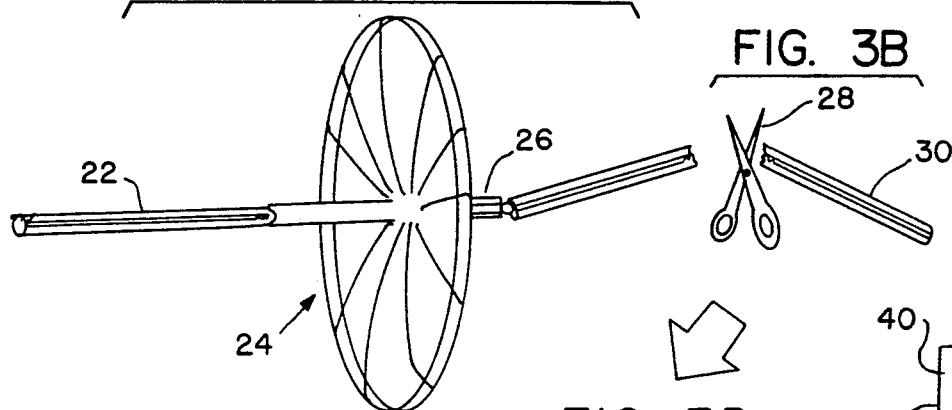
FIG. 3A
FIG. 3B
FIG. 3C
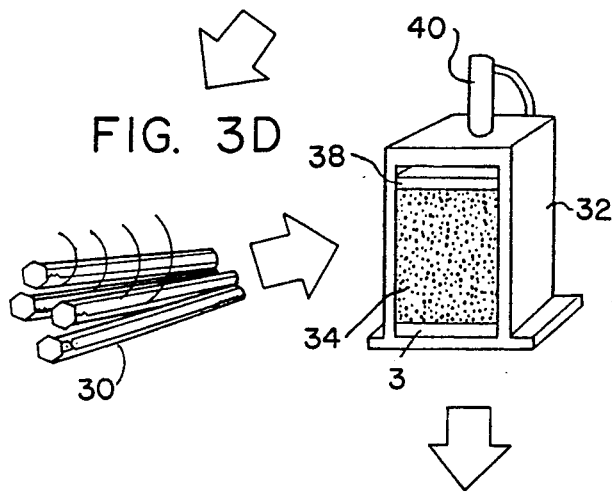
FIG. 3D
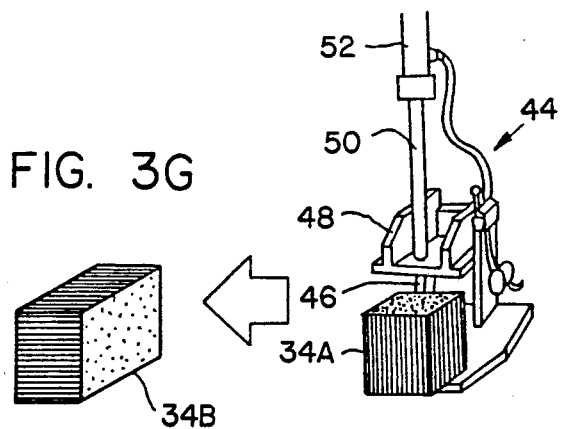
FIG. 3G
FIG. 3F
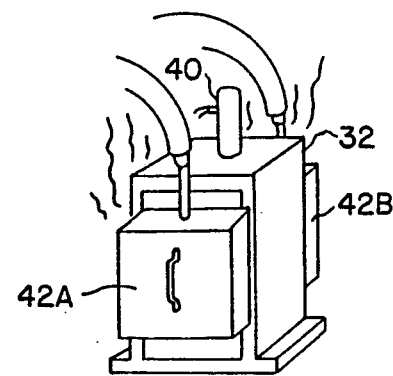
FIG. 3E

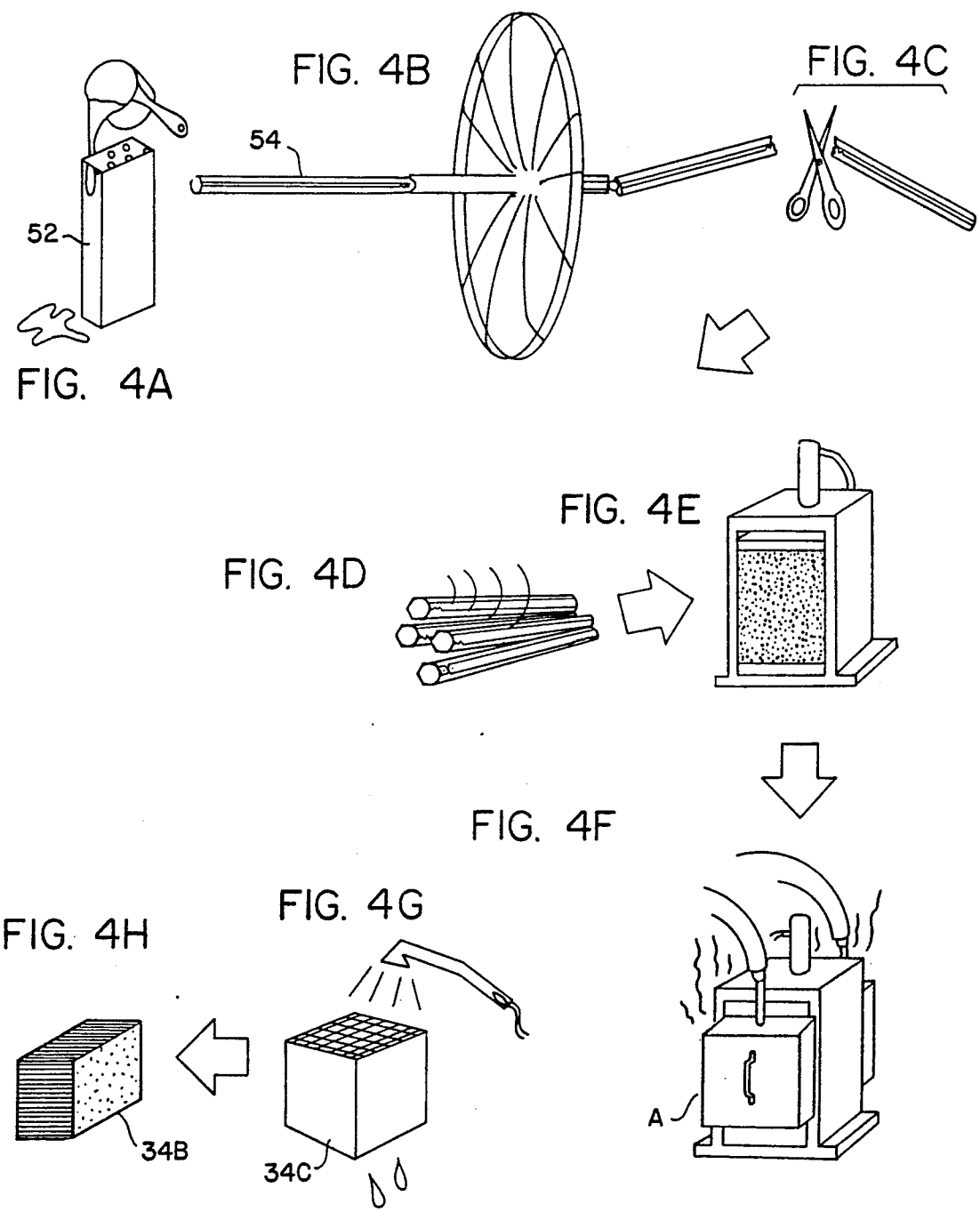

BRAIDED PREFORM PROCESS FOR THERMOPLASTIC HONEYCOMB CORES

FIELD OF THE INVENTION

This invention relates to composite structures as used in aircraft, and more particularly to a manufacturing process for processing preimpregnated thermoplastic fiber material into blocks of honeycomb ducted core material capable of sustained service at high temperature.

BACKGROUND OF THE INVENTION

Composite structures in aircraft typically utilize a tough surface skin layer supported by a lightweight core material. Development efforts to increase the strength/weight ratio of the core have resulted in cellular plastic structures such as rigid expanded foam of random cell pattern. Superior structural properties have been realized in cores formed in a geometric honeycomb pattern of hexagonal ducts, achieving very light weight due to the high percentage of air volume in the range of 90% to 98%. Such a core, when sandwiched between two skins, forms a structure possessing a uniform crushing strength under compression.

In known art, such cellular or ducted cores are commonly made from thermosetting resins. Utilization of such structures has expanded to include areas previously avoided due to structural demands and temperature, vibration and impact loading environments. Thermosetting resins, commonly used, have been found to lack the toughness and high temperature strength and stability needed for these applications.

New thermoplastic materials have offered improved properties; for example composite skin-surfaced structures having honeycomb cores made from preimpregnated thermoplastic fiber material provide excellent impact strength and damage tolerance. However, by their nature, the new thermoplastic materials require new and unconventional processing methods. As opposed to conventional thermosetting processes where sticky and viscous fluids are saturated into reinforcing fiber forms to be cured by catalysis and heat, thermoplastics, which have no cure cycle are hard and "boardy" initially, and have to be melted at high temperatures to be worked to the desired shapes. Thus completely different processing schemes are required for thermoplastics than those that have been developed for thermosets.

In known art, thermoset honeycomb material is made by a process that takes advantage of the flexibility of the reinforcing fabric before it is impregnated with resin. It is bonded and then expanded into hexagon honeycomb structure while it is soft, then wash coated with resin which is subsequently cured to give stiffness.

In contrast, thermoplastics, utilized in the present invention for their superior ultimate properties, are too viscous to be wash coated or by some other means saturated into the fabric after bonding the sheets together. The practical options for bonding thermoplastic core material together are further limited by the difficulty of making good adhesive bonds with thermoplastics. For these reasons, thermal fusion bonding of thermoplastic material into a ducted honeycomb structural pattern has been selected as the method for producing strong lightweight core materials in the present invention, which addresses new processing methods for realizing the full benefits of the superior ultimate properties of such structure.

Preimpregnated thermoplastic fiber material is available both in ribbon (continuous woven fabric sheet) and yarn form. The first step in processing preimpregnated thermoplastic fiber material into ducted honeycomb core blocks is to preform the thermoplastic material into a shape or pattern in preparation for bonding around hex mandrels into the desired ducted honeycomb pattern.

In a method of known art, thermoplastic ribbon is corrugated in a half hex pattern and cut into sheets which are stacked together with metal mandrels. The stack is pressurized and heated to fusion bond the material into a ducted matrix structure around the mandrels, which are then extracted individually in a press. Some disadvantages of this method are: (a) stacking is slow and erratic because the corrugated sheets tend to be springy and have to be coaxed into place, (b) individual mandrel extraction is slow, risky, and skill intensive, requiring a special long stroke thin pin pneumatic press, and (c) in the resulting structure, the wall thickness at the bonded interfacial facets is double that of the other walls, imposing 33% "dead weight" penalty because any strength from the double thickness walls is directional and does not contribute significantly to the overall useful strength.

OBJECTS AND SUMMARY OF THE INVENTION

A primary object of this invention is to provide a method of processing pre-impregnated thermoplastic fiber to efficiently produce a core material of ducted honeycomb structure, including a preforming and stacking process that will inherently yield equal thickness in all walls of the honeycomb structure.

A further object is to provide a process improvement to facilitate removal of forming mandrels following thermal fusion bonding of thermoplastic cores in a honeycomb duct pattern.

The present invention provides honeycomb core structure having uniform wall thickness by braiding preimpregnated thermoplastic fiber yarn along shaped mandrels positioned end to end, then cutting the braid apart at the end of the mandrels, stacking the sleeved mandrels in a honeycomb pattern and thermal fusion bonding them together in a press. This method eliminates other preforming such as corrugating ribbon material in a heated roll-forming press. Stacking of the sleeved cores is straightforward and labor-efficient. In the finished core, braided fibers offer more resistance to shear, compression and tension than known woven fiber patterns. The ducts have braided, double thickness walls that are bonded on all sides, providing a strong, well balanced structure.

In a further embodiment of the present invention, mandrels are cast from a washable high temperature eutectic salt so that they can be easily removed from bonded core blocks by a hot water wash, eliminating the costly labor, skills and special equipment required in the individual mandrel extraction method.

In a still further embodiment of the invention, there is provided a ducted core structure provided wherein the wall of the ducts are formed of braided thermoplastic preimpregnated fiber.

The manner of making and using the teachings and embodiments of the present invention to meet the above objects and to realize the advantages of the invention will be best understood from a study of the accompanying drawings and the following descriptions thereof.

BRIEF DESCRIPTION OF THE DRAWINGS

FIG. 3A through FIG. 3G is a series of schematic representations of the process steps in a method of producing honeycomb ducted thermoplastic cores from preformed sleeves braided along metallic forming mandrels in accordance with this invention.

FIG. 4A through FIG. 4H is a series of schematic representations of the process steps in a method of producing honeycomb ducted thermoplastic cores from preformed sleeves braided along water-soluble forming mandrels in accordance with this invention in a preferred embodiment.

DETAILED DESCRIPTION OF THE INVENTION

Figure 1:
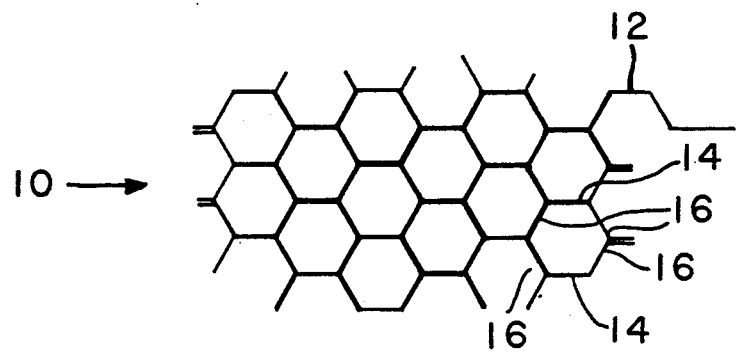
FIG. 1 is a cross sectional representation of a thermoplastic core of ducted honeycomb pattern of known art having non-uniform wall thicknesses, as produced in a process where half hex corrugated sheets are bonded at interfacing facets.

FIG. 1 shows a cross sectional view of a region of honeycomb core 10 formed from half hexagonal, hereafter called hex, corrugated sheets 12 stacked horizontally and bonded at their common interfacial facets 14. The structure imbalance is apparent: in each hex duct, there is a double wall thickness at the bonded top and bottom horizontal interfacial facets 14 while there is only a single thickness at the other four facet walls 16. The double wall regions 14 represent "dead" weight since any excess strength they contribute is directionally non-uniform, so the useful strength is predominantly limited by the single thickness walls 16.

Figure 2:
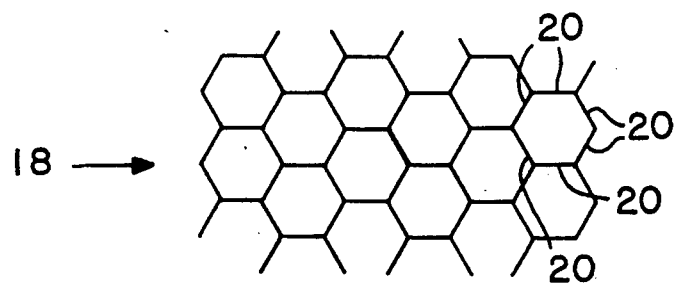
FIG. 2 is a cross sectional representation of a thermoplastic core of ducted honeycomb pattern having uniform wall thickness, as produced in accordance with this invention.

FIG. 2 shows a cross sectional view of a region of honeycomb core 18 formed from preformed hex sheaths braided over forming mandrels in accordance with the present invention. Each of the size facets of each sheath contacts an adjacent facet at the interfacial duct walls 20, and all interfacing pairs of facets are thermal fusion bonded together to form a balanced honeycomb pattern in which all of the duct walls 20 have equal thickness as shown, providing practically uniform strength in all directions in the plane shown.

The effective wall thickness can be controlled by the fabric thickness and density of the sheath. If the thickness in FIG. 2 is made the same as the sheets in FIG. 1, then the strength is doubled and the weight increased by ⅛ compared to FIG. 1. If the sheaths in FIG. 2 are made half the thickness of the sheets in FIG. 1, then for about equal strengths the unbalanced structure of FIG. 1 would be ⅛ heavier. Thus, the balanced structure offers a 33% advantage in strength/weight ratio.

The pictorial flow diagram shown in FIGS. 3A–3G illustrates the key process steps in a method of processing thermoplastic yarn braided over metallic mandrels in accordance with the present invention to produce honeycomb core material of balanced structure.

At step A (FIG. 3A) metallic hex shaped mandrels 22, typically of aluminum treated with a release agent, are introduced end to end into a braiding machine 24 which braids a sheath 26 from thermoplastic fiber yarn along each of the mandrels 22 which are moved from left to right through the braiding machine 24 which is of well known technology as utilized commonly to braid sheath over such items as automotive hoses and coaxial cables.

At step B the sheath 26 is cut apart with shears 28 as shown, or alternatively sawed or sheared, at the ends of each mandrel so as to yield sheathed mandrels 30, which at step C are stacked uniformly into a press (FIGS. 3C and 3D). At step D, a full stack 34, supported on lower platen 36, is compressed by upper platen 38 from a hydraulic cylinder 40 which may be pressurized by a manual pump and monitored by a pressure gauge. Half hex spacers at the top and bottom of the stack 34 provide conformal support.

At step E (FIG. 3E) the press 32 is enclosed by heating units 42A and 42B and, with pressure applied to the stack from cylinder 40 sufficient to hold the sheaths in contact at all facets. Hot air is directed onto the stack by jet arrays in heating units. 42A and 42B to bring the stack up to bonding temperature, softening the material and fusion bonding all the interfaces together, forming hex ducts around the mandrels. Then after heat is removed and the temperature drops enough for the material to set, pressure is removed.

At step F (FIG. 3F) the bonded stack 34A, after cooling and removal from the bonding press, must have the mandrels extracted. This is not a trivial task since the mandrels tend to be partially bonded despite the previous application of a release agent. A special long stroke pneumatic press 44 is fitted with a long thin drive pin 46, supported by a bracket 48 and a sleeve 50, actuated from a pneumatic cylinder 52. Each mandrel is pressed out individually; this operation tends to be difficult and critical, requiring considerable skill and attention to avoid damaging the core duct walls, particularly from mushroom deformation of the ends of the aluminum mandrels. To prevent buckling, the punch pin 46 may require support from both floating and stationary bushings.

At step G (FIG. 3G), with all of the mandrels extracted, the finished block 34B of honeycomb core material is ready to be shaped for particular end use, for example cut into slices and/or machined.

The pictorial flow diagram shown in FIGS. 4A–4H illustrates the key process steps in a method of processing thermoplastic yarn braided over water-soluble mandrels in accordance with a preferred embodiment of the present invention to produce honeycomb core material of balanced structure.

At step A, hex mandrels are cast from a water-washable, high temperature eutectic salt, poured in liquid form into a casting mold 52. Then the water soluble hex mandrels 54 are utilized in the braiding, stacking, and thermal fusion bonding operations of steps B through F (FIGS. 4B–4F) in identically the same manner as described above in steps (FIGS.3A–3F) A through E respectively in connection with FIG. 3, where the mandrels 22 were metallic.

However, at step G (FIG. 4G), the water soluble mandrels are removed by flowing hot water over the bonded block 34C to dissolve the mandrels and flush out residue from each hex duct. At step H the finished block 34B of honeycomb core material (the same as at step G of FIG. 3B) is ready to b shaped for particular end use, for example cut into slices and/or machined.

Both the metallic mandrel method of FIGS. 3A–3G and the water soluble mandrel method of FIGS. 4A–4H are capable of producing blocks of high quality core material having a balanced honeycomb ducted pattern, however the water soluble mandrel method of FIGS. 4A-4H is preferred because of the significant labor and cost savings in eliminating the need for extraction press removal of mandrels from the bonded stack.

The particular hex duct honeycomb pattern shown herein should not be considered as restrictive; the processes of this invention are generally applicable to ducted cores of various matrix patterns of which the honeycomb is representative.

The invention may be embodied in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A method of producing a ducted core structure from preimpregnated thermoplastic fiber yarn comprising the steps of:
   (a) braiding preimpregnated thermoplastic fiber yarn lengthwise along hexagon shaped mandrels so as to form a braided sheath surrounding each mandrel;
   (b) stacking said mandrels, each thusly sheathed, in a lattice patterned stack;
   (c) bonding said sheaths together at interfacial facets thereof by application of heat to said stack; and
   (d) removing said mandrels from said stack to provide a ducted core structure having a hexagon shaped cells.

2. The method according to claim 1 wherein said mandrels are formed prior to said step (a) by casting shaped mandrels with a washable, high temperature eutectic salt, and wherein, after said bonding step (c), said mandrels are removed from said stack in said step (d) with a hot water wash.

3. The method according to claim 1 wherein said mandrels in said step (a) are positioned end to end, and wherein step (a) further comprises cutting said sheath apart at ends of said mandrels.

4. The method according to claim 1 wherein said step (c) further comprises applying pressure to said stack to as to contact interfacial facets of said sheath, and wherein step (d) further comprises removing said heat and then, when said stack has cooled to below a setting temperature, removing said pressure.

5. A method for making a block of hexagonal honeycomb ducted core structure from a length of preimpregnated braided reinforced thermoplastic yarn having a softening temperature above which thermoplastic fusion between adjacent sections of yarn can take place;
   providing a plurality of elongate mandrels having a hexagon shape in cross section;
   braiding the yarn into a hollow core sheath surrounding each mandrel;
   stacking the sheathed mandrels in a close packed 3-dimensional hexagonal array in which each face of each sheath is in contact with the face of an adjacent sheath throughout the interior volume of the array to form a honeycomb structure of open cells of hexagonal shape each side of each cell being bounded by double walls from two adjacent sheaths;
   mechanically pressing the array so formed while heating the array to a thermoplastic fusion temperature;
   subsequent cooling the array to below thermoplastic fusion temperature so that said sheaths are intimately bonded together throughout the array by fusion of the thermoplastic material impregnated into said yarn;
   removing said pressure and removing said mandrels to leave a block of honeycomb.

6. A ducted core structure formed from preimpregnated thermoplastic fiber yarn comprising a plurality of ducts with mutually joining walls, said walls being formed of braided preimpreganted thermoplastic fiber yarn.

7. A ducted core structure according to claim 6 wherein said adjoining walls are formed of a double layer of said braided preimpregnated thermoplastic yarn.

* * * * *

UNITED STATES PATENT AND TRADEMARK OFFICE
CERTIFICATE OF CORRECTION

PATENT NO. : 5,128,192
DATED : July 7, 1992
INVENTOR(S) : John K. Narasaki

It is certified that error appears in the above-identified patent and that said Letters Patent is hereby corrected as shown below:

On the title page:

Item [75]: the identification of the inventor should read
-- Inventor: John K. Narasaki --

Signed and Sealed this

Tenth Day of August, 1993

Attest:

MICHAEL K. KIRK

*Attesting Officer*  *Acting Commissioner of Patents and Trademarks*